No. 867,552. PATENTED OCT. 1, 1907.
A. N. BRADFORD & W. H. HOLDEN.
MEANS FOR FASTENING TIRES TO WHEEL RIMS.
APPLICATION FILED DEC. 1, 1905.
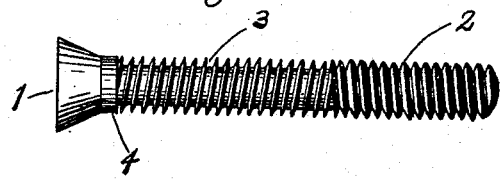
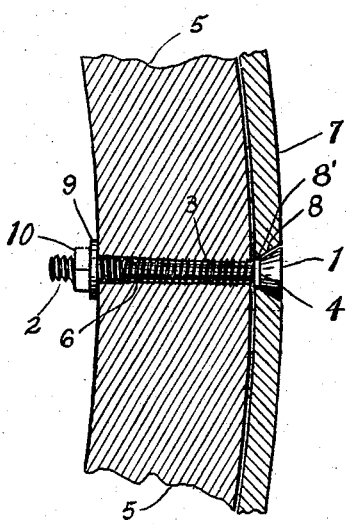

UNITED STATES PATENT OFFICE.

ALLEN N. BRADFORD, OF STERLING, AND WILLIAM HENRY HOLDEN, OF ROCK FALLS, ILLINOIS, ASSIGNORS TO RUSSELL BURDSALL & WARD BOLT & NUT COMPANY, OF PORT CHESTER, NEW YORK.

MEANS FOR FASTENING TIRES TO WHEEL-RIMS.

No. 867,552.  Specification of Letters Patent.  Patented Oct. 1, 1907.

Application filed December 1, 1905. Serial No. 289,906.

*To all whom it may concern:*

Be it known that we, ALLEN N. BRADFORD and WILLIAM HENRY HOLDEN, citizens of the United States, residing, respectively, at Sterling, in the county of Whiteside and State of Illinois, and at Rock Falls, in the county of Whiteside and State of Illinois, have invented certain new and useful Improvements in Means for Fastening Tires to Wheel-Rims; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention has reference to means for fastening tires to wheel rims.

The chief advantage of our device consists in a novel construction whereby any tendency of the bolt to turn in a rearward direction, when in position in the wheel, results in such bolt becoming more firmly secured in place, and prevents the working loose thereof.

In the drawings: Figure 1 shows a bolt embodying our invention. Fig. 2 is a longitudinal section of a small segment of a wheel, with our device in position therein.

The bolt comprises a head 1; a threaded portion 2, adapted to have a nut secured thereon; and a threaded portion 3, covering the usual shank of the bolt. A shoulder 4 is preferably provided between the threaded portion 3 and the head 1.

5 represents the wooden felly of the wheel, provided with a perforation 6 for the insertion of the bolt. (Fig. 2.)

7 is the tire, provided with a hole 8, also for the passage of the bolt, and seating of the head thereof.

The bolt is provided at its inner end with the usual washer 9 and is held in place by the nut 10.

The spirals of the threaded portion 3 are disposed on the body of the bolt in a direction opposite to that of the spirals on the part 2. For instance, if the part 2 is provided with what is known as a right-handed thread, the thread on the portion 3 is left-handed, and vice versa. The diameter of the portion 3 is slightly greater than that of the portion 2, as will be hereinafter more particularly set forth. The diameter of the perforation 6 is such as to permit the bolt to be readily forced or driven therein, and when in place the threads of the portion 3 become slightly embedded in the walls of the hole 6.

As illustrated in the drawings, the portion 2 has the usual right-handed thread, and the nut 10 corresponds thereto, while the portion 3 is provided with a left-handed thread. As a result, the turning of the bolt rearwardly, or unscrewing thereof, by reason of the engagement of the threads on the shank of the bolt with the walls of the hole 6, will cause such bolt to be drawn more firmly into place in the felly, and hold the head 1 tightly in position in the tire.

The shoulder 4 is designed to fill the straight portion 8' of the hole 8, and aid in holding the bolt from lateral movement. This could not be as well accomplished if the shoulder 4 were omitted, and the threaded portion of the bolt extended to take the place thereof, as the threads which were in contact with the tire would soon become worn and imperfect.

The bolt can be readily constructed from blanks of proper shape by the rolling process, the dies being so formed as to produce both of the threaded portions in one operation. It is preferred to have the spirals on the shank of the bolt slightly spaced apart, and provided with a sharp thread, or apex, causing such spirals to act more readily in the wooden walls of the perforation 6. The spirals of the portion 2, however, have a heavier thread, and are formed adjacently, the same being more serviceable for use with the nut 10.

The body portion of the blank from which the bolt is formed is of the same diameter throughout, and in the rolling process substantially the same amount of material is used in the formation of the threads. By reason, however, of the wider spacing of the spirals on the portion 3, the thread is forced outwardly a slight distance farther than the thread on the part 2, resulting in the diameter of the former thread being a little greater than that of the latter, as hereinbefore mentioned.

Difficulty is frequently experienced in placing a nut on a tire bolt, by reason of the tendency of the bolt to turn in the felly. This is especially true after a wheel has been in use for a time, and the hole for the bolt has become worn. Our device is specially designed to overcome this difficulty, not only through the engagement of the thread on the shank of the bolt with the adjacent walls of the bolt-hole, but also through the tendency of such engagement to draw the head of the bolt tightly into its seat, and increase the friction between such head and the tire.

What we claim as our invention, and desire to secure by Letters Patent of the United States, is:

In combination, a wheel rim, a tire thereon, said rim being formed with an opening, said tire being formed with an opening registering with the rim opening, the outer portion of the tire opening tapering outwardly and the portion of the tire opening adjacent to the wheel rim having parallel walls and being of slightly greater diameter than the rim opening, a bolt formed with a tapering head which is received by the outwardly tapering portion of the tire opening, a collar on the bolt received in the portion of the tire opening with parallel walls, said collar abutting against the outer face of the wheel rim, a left hand threaded portion on the outer end of the bolt, said threads being of greater diameter and of less length than the rim opening and received thereby, a right hand threaded portion on the inner end of the bolt and being of less diameter than the left hand threaded portion and than the rim opening and being received in the rim opening and projecting beyond the inner face of the rim, and a nut and washer on the said projecting bolt end for securing the parts together.

In testimony whereof, we affix our signatures, in presence of two witnesses.

ALLEN N. BRADFORD.
WILLIAM HENRY HOLDEN.

Witnesses:
    I. L. WEAVER,
    C. E. WOODBURN.